Aug. 12, 1924.

J. W. MEADOWCROFT

PROCESS OF ELECTRIC WELDING

Filed June 30, 1921

1,504,367

WITNESS:
Walter M. Prout

INVENTOR.
JOSEPH W. MEADOWCROFT
BY
C. B. DesJardins
ATTORNEY.

Patented Aug. 12, 1924.

1,504,367

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

PROCESS OF ELECTRIC WELDING.

Application filed June 30, 1921. Serial No. 481,729.

*To all whom it may concern:*

Be it known that I, JOSEPH W. MEADOWCROFT, a citizen of the United States, residing at Philadelphia, Pennsylvania, have invented certain new and useful Improvements in Processes of Electric Welding, of which I declare the following to be a full, clear, and exact description.

This invention relates to a new and improved process of electric welding and has to do, more particularly, with improvements in the method or process of joining together metal sheets by electric spot-welding.

When two metal sheets are spot-welded together, in accordance with the customary practice, the fusing of the metal and the pressure applied results in the formation of a "low" spot at the weld. In other words, the thickness of the metal, at the weld, is slightly less than the combined thicknesses of the two overlapping sheets, at an unwelded portion. This difference in thickness is not very great but, where a finish is to be applied to the surface of one of these sheets, it is objectionable since these "low" spots would give an undesirable appearance to the finished surface. To overcome this difficulty, it has been the practice to eliminate these "low" spots by grinding off the remainder of the surface so as to bring it down to the same level as the welds. This practice is slow and costly but, heretofore, it has been necessary in order to produce a satisfactory surface.

The main object of my invention is to provide a process of welding which will not produce these "low" spots in the surface to be finished, so that the grinding away of the surface surrounding the welds may be eliminated.

Further objects of my invention will definitely appear from the detailed description to follow. My invention is clearly defined and pointed out in the appended claims. A process constituting one preferred embodiment of my invention is described in the specification and illustrated in the accompanying drawing, forming a part of this specification, in which:

In the drawing, similar reference numerals refer to similar parts throughout the several views.

In general, I accomplish the objects of my invention by spot-welding the metal sheets together in such a manner as to cause part of the metal at the weld to project or protrude above the surface of the surrounding metal, forming a small teat or projection at the weld. The weld should be so made that this projection protrudes from the surface to be finished, that is, the surface in which any "low" spots would be objectionable as stated heretofore. After the metal sheets have been joined together by a series of welds made in this manner, I remove the small teats or projections in any suitable manner, as, for instance, by grinding these teats or projections down to the level of the surrounding surface. This surface then has no "low" spots and its appearance, when finished, will be very desirable.

Figure 1:
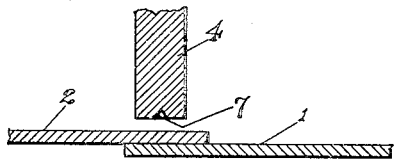
Fig. 1 is a diagrammatic view showing the welding of two sheets according to my invention.
Figure 2:
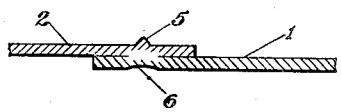
Fig. 2 is a sectional view through a weld, taken on line 2—2 of Fig. 4, prior to removing the projecting part of the weld.

In the drawing, I have illustrated one embodiment of my invention which has proven very desirable. In Fig. 1, I have shown the metal sheets, 1 and 2, with their ends overlapping and inserted between the electrodes, 3 and 4, of an electric spot-welding machine. The lower electrode, 3, is of the form commonly used in such machines and the upper electrode, 4, is also of the usual form except that it has a small, conical recess, 7, arranged centrally in the lower end of the electrode. The metal sheets, 1 and 2, should be inserted between the electrodes so that the surface to be finished is nearest to the electrode, 4, having the recess, 7. The electrodes, 3 and 4, are caused to approach each other and engage and clamp between them the overlapped metal sheets, 1 and 2, the electrical circuit being closed so that the current flows from one electrode to the other through the metal sheets. The heat generated by the passage of the electric current through the metal sheets, at the point where they are engaged by the electrodes, causes the metal to fuse and, since the electrodes apply considerable pressure at this point, the fused metal is also forced into the recess, 7, of the electrode, 4, forming the small projection, 5, at the weld, which protrudes from the surface to be finished. A "low" spot, 6, will also be formed at the weld in the exposed surface of the sheet, 1, but this is not objectionable since this surface is not to be finished. When the sheets are connected by the usual spot-welding operation, such "low" spots are formed in both of the exposed surfaces and it is to be noted that, in my invention, one of these "low" spots is eliminated.

Figure 3:
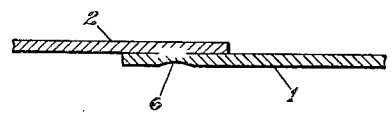
Fig. 3 is a similar, sectional view through a weld after the removal of the projecting part.
Figure 4:
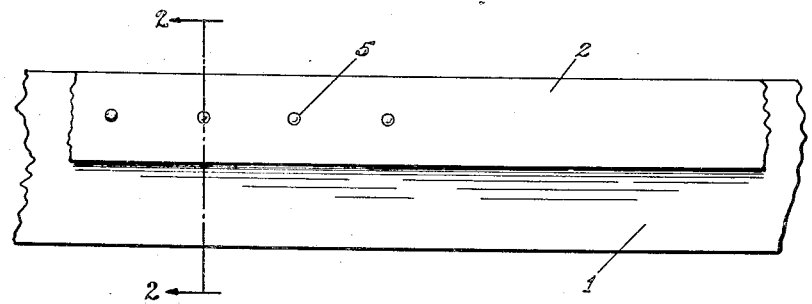
Fig. 4 is a plan view of two sheets joined together in accordance with my invention, part of the weld projections being removed and part shown.

The second step in my process consists in removing these weld projections, 5. This is done very satisfactorily by grinding these projections down to the level of the surrounding surface. The result is that the exposed surface of the metal sheet 2, is uniform and without any objectionable depressions. Fig. 3 is a sectional view through a completed weld and shows the uniformity of the exposed surface of the metal sheet, 2.

In carrying out my invention in actual practice, the metal sheets which I have joined together have been of steel and the electrodes, 3 and 4, which I have used, have been of copper. It will be seen that, in this case, the resistivity of the metal sheets, 1 and 2, is greater than that of the electrodes, 3 and 4, so that the greater part of the fusing heat is generated in the sheets to be joined due to their resistance to the passage of the current. This has given very satisfactory results but I do not wish to be limited to the joining together of pieces of steel or to the use of copper electrodes, as I believe that other metals may be joined together by my process and that other materials may prove satisfactory for the electrodes.

It is to be noted that, by the use of this process, in cases where one of the surfaces of the welded members is to be finished, the work can be accomplished at a lower cost than heretofore. The welding operation is no more costly and no slower than heretofore, and the amount of grinding necessary is much less than has been required previously. It is a much simpler and cheaper operation to grind the weld projections down to the level of the surrounding surface, than to grind the surface down to the level of the "low" spots at the welds.

I am aware that my invention is susceptible of considerable variation without departing from the spirit thereof and, therefore, I claim my invention broadly, as indicated by the appended claims.

Having thus described my invention, what I claim as new and useful and desire to secure by Letters Patent is:—

1. The process of uniting two pieces of metal consisting in forming a projection protruding above the surface of one of said pieces, electrically welding the pieces of metal together at said projection, and subsequently removing that part of the projection protruding above the surrounding surface.

2. The process of uniting two pieces of metal consisting in forming a projection in one of said pieces protruding above the surface thereof, electrically spot-welding the pieces of metal together at said projection, and subsequently removing said projection.

3. The process of uniting two pieces of metal consisting in simultaneously electrically welding said pieces together and forming a projection protruding above the surface of one of said pieces at the weld, and consequently removing said projection.

4. The process of uniting two pieces of metal consisting in forming simultaneously a spot-weld joining the two pieces and a projection protruding above the surface of one of said pieces at the weld, and subsequently removing said projection.

5. The process of uniting two pieces of metal consisting in electrically welding the pieces together at a spot and causing the metal to protrude above the surface of one of said pieces at said spot, and subsequently removing the metal protruding above said surface.

6. A process of uniting two pieces of metal including the simultaneous forming of an electric spot-weld joining the two pieces and forcing the fused metal of the weld into a projection protruding above the surface of one of the pieces at said weld.

7. A process of uniting two pieces of metal including the electrical welding of the pieces together at a spot and causing the fused metal of the weld to protrude above the surface of one of said pieces at said spot.

8. The process of uniting two pieces of metal consisting in forming a projection protruding above the surface of one of said pieces, electrically welding the pieces of metal together at said projection, and subsequently grinding said projection down to the level of the surrounding surface.

9. The process of uniting two pieces of metal consisting in forming a projection in one of said pieces protruding above the surface thereof, electrically spot-welding the pieces of metal together at said projection, and subsequently grinding said projection down to the level of the surrounding surface.

10. The process of uniting two pieces of metal consisting in simultaneously electrically welding said pieces together and forming a projection protruding above the surface of one of said pieces at the weld, and subsequently grinding said projection down to the level of the surrounding surface.

11. The process of uniting two pieces of metal consisting in forming simultaneously a spot-weld joining the two pieces and a projection protruding above the surface of one of the pieces at the weld, and subsequently grinding said projection down to the level of the surrounding surface.

12. The process of uniting two pieces of metal consisting in electrically welding the pieces together at a spot and, simultaneously, forcing the fused metal of the weld above the surface of one of said pieces.

13. The process of uniting pieces of metal consisting in fusing the metal pieces at the point where they are to be united and causing the fused metal to form a projection protruding beyond the surface of one of said pieces, and finally removing said projection.

14. The process of uniting pieces of metal consisting in fusing the metal pieces at the point where they are to be united and subjecting the metal while in fused condition to pressure and forming a protruding projection of the fused metal in the outer surface of one of said pieces, and finally removing the projection.

In testimony whereof, I affix my signature.

JOSEPH W. MEADOWCROFT.

Certificate of Correction.

It is hereby certified that in Letters Patent No. 1,504,367, granted August 12, 1924, upon the application of Joseph W. Meadowcroft, of Philadelphia, Pennsylvania, for an improvement in " Processes of Electric Welding," an error appears in the printed specification requiring correction as follows: Page 2, line 84, claim 3, for the word " consequently " read *subsequently;* and that the said Letters Patent should be read with this correction therein- that the same may conform to the record of the case in the Patent Office.

Signed and sealed this 14th day of October, A. D. 1924.

[SEAL.]
KARL FENNING,
*Acting Commissioner of Patents.*